(12) United States Patent
Larsson et al.

(10) Patent No.: US 8,950,381 B2
(45) Date of Patent: Feb. 10, 2015

(54) FUEL SUPPLY UNIT

(75) Inventors: Mikael Larsson, Jönköping (SE); Bo Carlsson, Alingsås (SE); Björn Landén, Huskvarna (SE); Mats Lavenius, Partille (SE)

(73) Assignee: Husqvarna AB, Huskvarna (SE)

( * ) Notice: Subject to any disclaimer, the term of this patent is extended or adjusted under 35 U.S.C. 154(b) by 1059 days.

(21) Appl. No.: 12/922,951

(22) PCT Filed: Mar. 17, 2008

(86) PCT No.: PCT/SE2008/050291
§ 371 (c)(1),
(2), (4) Date: Jan. 10, 2011

(87) PCT Pub. No.: WO2009/116902
PCT Pub. Date: Sep. 24, 2009

(65) Prior Publication Data
US 2011/0095215 A1 Apr. 28, 2011

(51) Int. Cl.
*F02M 51/00* (2006.01)
*F02D 37/02* (2006.01)
(Continued)

(52) U.S. Cl.
CPC ............... *F02D 37/02* (2013.01); *F02D 9/105* (2013.01); *F02D 9/1055* (2013.01);
(Continued)

(58) Field of Classification Search
USPC ......... 123/445, 456, 457, 459, 462, 399, 403, 123/404, 437, 438; 251/65, 129.1; 335/253, 335/274; 137/601.14, 601.17
See application file for complete search history.

(56) References Cited

U.S. PATENT DOCUMENTS 2,094,860 A 12/1932 Timian et al.
4,117,813 A 10/1978 Yamashita et al.
(Continued)

FOREIGN PATENT DOCUMENTS

GB 1491884 A 11/1977
JP 8304011 11/1996
WO 9200453 A1 1/1992

OTHER PUBLICATIONS

Written Opinion of the International Preliminary Examining Authority, dated Jan. 20, 2010, pp. 1-12.
(Continued)

*Primary Examiner* — John Kwon
(74) *Attorney, Agent, or Firm* — Novak Druce Connolly Bove + Quigg LLP

(57) ABSTRACT

A fuel supply unit (1) is provided e.g. a carburetor or a low pressure injection system of an internal combustion engine. The fuel supply unit (1) includes a main air passage (3), which has a throttle valve (8, 9) mounted therein and the throttle valve (8, 9) includes a throttle shaft (8) extending between two to one another opposite located shaft sides (6, 7). A control module (2) for the fuel supply (2) is mounted to one (7) of the shaft sides (6, 7), which control module (2) includes throttle position detecting means (30; 300) for monitoring the position of the throttle valve (8, 9), and fuel valve means (60) for controlling the fuel supply to the main air passage (3). Also, an ignition system is provided which is able to control the ignition timing with respect to status of the at least one of the means (30; 300, 40, 60, 100) in the control module (2) in order to at least control the idle speed of the engine. The ignition system further being arranged to power at least one of the means (30; 300, 40, 60, 100) of the control module (2).

23 Claims, 13 Drawing Sheets

(51) Int. Cl.

| | | |
|---|---|---|
| *F02D 9/10* | (2006.01) | |
| *F02D 11/10* | (2006.01) | |
| *F02D 35/00* | (2006.01) | |
| *F02M 17/12* | (2006.01) | |
| *F16K 31/08* | (2006.01) | |
| *F16K 37/00* | (2006.01) | |
| *G01D 5/249* | (2006.01) | |
| *F02B 63/02* | (2006.01) | |
| *F02D 41/06* | (2006.01) | |
| *F02D 41/08* | (2006.01) | |
| *F02M 17/04* | (2006.01) | |

(52) U.S. Cl.
CPC ......... *F02D 11/106* (2013.01); *F02D 35/0053* (2013.01); *F02M 17/12* (2013.01); *F16K 31/082* (2013.01); *F16K 37/0033* (2013.01); *F16K 37/0041* (2013.01); *G01D 5/2492* (2013.01); *F02B 63/02* (2013.01); *F02D 35/0007* (2013.01); *F02D 41/067* (2013.01); *F02D 41/08* (2013.01); *F02D 2200/0404* (2013.01); *F02D 2400/06* (2013.01); *F02D 2400/14* (2013.01); *F02M 17/04* (2013.01)
USPC ............ 123/490; 123/457; 123/462; 251/65; 137/601.14

(56) References Cited

U.S. PATENT DOCUMENTS

| | | | | |
|---|---|---|---|---|
| 4,306,589 | A | * | 12/1981 | Harned et al. ........... 137/625.65 |
| 4,492,198 | A | | 1/1985 | Okumura |
| 4,653,720 | A | * | 3/1987 | Knapp et al. .................... 251/65 |
| 4,794,890 | A | | 1/1989 | Richeson, Jr. |
| 5,020,497 | A | | 6/1991 | Umehara et al. |
| 5,313,918 | A | | 5/1994 | Agren |
| 5,479,890 | A | * | 1/1996 | Hu et al. ........................ 123/322 |
| 5,551,411 | A | * | 9/1996 | Ward ............................. 123/684 |
| 5,954,494 | A | | 9/1999 | Goldsmith et al. |
| 6,041,765 | A | | 3/2000 | O'Neill et al. |
| 6,068,010 | A | * | 5/2000 | Reinicke ........................... 137/1 |
| 6,199,587 | B1 | * | 3/2001 | Shlomi et al. .............. 137/625.5 |
| 6,604,497 | B2 | * | 8/2003 | Buehrle et al. ................ 123/90.12 |
| 7,347,191 | B2 | * | 3/2008 | Atwood et al. ................ 123/516 |
| 8,141,842 | B2 | * | 3/2012 | Imamura et al. ................. 251/65 |
| 8,505,573 | B2 | * | 8/2013 | Herbert et al. ................ 137/554 |
| 2002/0046717 | A1 | * | 4/2002 | Buehrle et al. ............. 123/90.12 |
| 2004/0025949 | A1 | * | 2/2004 | Wygnaski ................. 137/624.18 |
| 2004/0129250 | A1 | | 7/2004 | Iizuka et al. |
| 2005/0279406 | A1 | * | 12/2005 | Atwood et al. ................. 137/39 |
| 2006/0090729 | A1 | | 5/2006 | Miyanoo et al. |
| 2007/0090315 | A1 | | 4/2007 | Bolz |

OTHER PUBLICATIONS

International Preliminary Report on Patentability, dated Feb. 19, 2010, pp. 1-10.

* cited by examiner

FUEL SUPPLY UNIT

TECHNICAL FIELD

The present invention relates to a fuel supply unit, e.g. a carburetor or a low pressure injection system, for controlling the air/fuel mixture to an internal combustion engine. The fuel supply unit includes a main air passage being provided with a throttle valve mounted therein, which throttle valve includes a throttle shaft, extending between two to one another opposite located shaft sides. Further, it relates to a control module of a fuel supply unit and its powering and possible cooperation with an ignition system of the engine.

BACKGROUND

Internal combustion engines of two-stroke or four-stroke type usually are equipped with a fuel supply system of carburetor type or injection type. In a carburetor, the throttle of the carburetor is affected by the operator's demand, so that wide open throttle produces a minimum throttling in the carburetor barrel. The depression created by the passing air in the carburetor venturi draws fuel into the engine.

Diaphragm-type carburetors are particularly useful for hand held engine applications wherein the engine may be operated in substantially any orientation, including upside down. Such carburetors typically include a fuel pump that draws fuel from a fuel tank and feeds the fuel to a fuel pressure regulator via a needle valve. The fuel pressure regulator usually includes a fuel metering chamber that stores fuel fed from the fuel pump and the fuel metering chamber is generally separated from atmosphere by a diaphragm that adjusts the fuel pressure to a constant pressure. The needle valve opens and closes the fuel passage from the fuel pump to the fuel metering chamber as the diaphragm moves. From the fuel metering chamber fuel is delivered to the main air passage via a main channel and an idle channel. The main channel leads to a main nozzle in the main air passage fluidly prior to the throttle valve, whereas the idle channel leads to an idle nozzle fluidly shortly after the throttle valve.

Local environmental conditions, such as temperature and altitude, as well as engine loading and fuel type used can affect engine performance. For instance, engines operated in cold weather require additional fuel, since cold conditions inhibit fuel vaporization and cold air is denser, requiring additional fuel to achieve the proper fuel/air ratio. At higher altitudes, the air is less dense, and less fuel is required to obtain the proper fuel/air ratio. Different fuel qualities may also affect the air-fuel ratio, for instance due to the amount of oxygen in the fuel. The engine may also behave differently at start-up, warm-up, acceleration and deceleration. All of these factors have an effect on the amount of fuel required for an optimal fuel-air ratio; it is therefore desirable to be able to easily affect the air-fuel ratio during operation of the engine.

Traditionally, carburetor engines have been equipped with stationary nozzles or manually adjustable nozzles to regulate the air-fuel ratio. However, as the demands on lower fuel consumption jointly with demands on cleaner exhaust have increased also electronically controlled nozzles have been suggested, for instance by having a solenoid valve in the passage between the fuel metering chamber and the nozzles in the main air passage, as e.g. in U.S. Pat. No. 5,732,682. While generally effective in reducing the harmful emissions to the atmosphere, the carburetors having solenoid valves are more costly and may require more time in assembly, thereby increasing the total costs associated with the manufacture of the carburetors. Another problem using fuel valve of solenoid type have been increased power consumption.

In particular when the engine is running at idle; the energy produced is low, and it is therefore advantageous that the engine can be controlled in such manner that the energy consumption is kept low during idle.

One parameter for controlling the air fuel ratio is the angular position of the throttle valve, which can be derived from a throttle position sensor. A known throttle position sensor includes a hall sensor and a magnet for detecting the full-open position of a butterfly throttle valve corresponding to the full throttle state of an internal combustion engine. A movable portion provided with a magnet rotates together with the throttle valve and has an end position corresponding to the full-open state of the throttle valve. A digital type of hall sensor is provided and being arranged to generate one of two possible signal values depending on whether it is actuated by said magnet or not actuated. The magnet on the movable portion is disposed so as to actuate the hall sensor when the movable portion is in said end position, whereby an output signal is generated by the hall sensor, which output signal is processed by signal processing means. What is referred to as a hall sensor often includes both the actual hall sensor and an integrated circuit (IC) amplifier.

The major drawback with a throttle position sensor of the type mentioned above is that it only provides a possibility to detect the full throttle state of the internal combustion engine and it is not possible to distinguish between part throttle and idle.

A conventional throttle position sensor which is often referred to as a rotation angle detector also has a magnet, rotating together with the throttle valve. Depending on the angle of the magnet, the magnetic field strength will vary at the position of a hall sensor and the output voltage of the hall sensor changes continuously in accordance with the strength of the magnetic field and the therefore also with the opening degree of the throttle valve. The output signal of the hall sensor can be processed by a signal processing means to be translated into an angle. The characteristics of a hall sensor vary e.g. with temperature and therefore, a temperature sensor can be provided for measuring the temperature of the hall sensor so as for a correcting means to apply the correct compensation at different temperatures of the hall sensor. What is referred to as a hall sensor often include both the hall sensor and an integrated circuit (IC) amplifier.

Often fuel supply units provided with such angle detectors are expensive and complex and have to be customized for the specific application, which means they are only offered by a very small number of suppliers.

SUMMARY OF THE INVENTION

It is an object of the invention to provide a fuel supply system with low fuel consumption and low exhaust emissions. This object is reached by a fuel supply unit of the type mentioned initially, wherein a control module for the fuel supply is mounted to one of the shaft sides of the fuel supply unit. The control module includes a throttle position sensor for monitoring the position of the throttle valve, a fuel valve for controlling the fuel supply to the main air passage and possibly an air valve for controlling the air supply to the main air passage. This way the air/fuel mixture to the engine is more easily adjusted for the current conditions and the fuel consumption is therefore lowered. Having the proper air/fuel mixture also enables getting most power out of the engine, which is very advantageous for e.g. operator-carried power tools such as chainsaws.

It is another object of the invention to provide a fuel supply system with low power consumption. This object is reached by a fuel valve and possibly also an air valve for controlling the air/fuel mixture to the internal combustion engine, of which at least one valve is only powered when changing state, i.e. switching from closed to open or from open to closed. More specifically, this object is reached by solenoid type of valve/s, which is/are further described in the detailed description section. Having low power consumption is very advantageous, since then the fuel supply system can be powered by the ignition system, which means there is no need for e.g. a battery or a generator. A battery or a generator adds costs and weight to the product, which is not very beneficial especially for handheld or other operator-carried power tools. Having no battery or generator also enables a smaller product which is of course advantageous in many cases, not only for products being carried by an operator.

It is yet another object of the invention to provide a fuel supply system with low fuel- and power consumption and still providing a simple power supply unit. This object is reached by a having at least some of the means for controlling the air/fuel mixture to the engine in a control module, which control module is mounted to the fuel supply unit as specified above. This way a standard type of fuel supply unit can be used, which is easily produced at a low price by any fuel supply unit manufacturer. Having a separate control module is also beneficial when it comes to replacing the control module or the fuel supply unit or when having the fuel supply system serviced.

BRIEF DESCRIPTION OF THE DRAWINGS

The invention will be described in the following in closer details by means of various embodiments thereof with reference to the accompanying drawings.

DETAILED DESCRIPTION OF PREFERRED EMBODIMENTS

Figure 1:
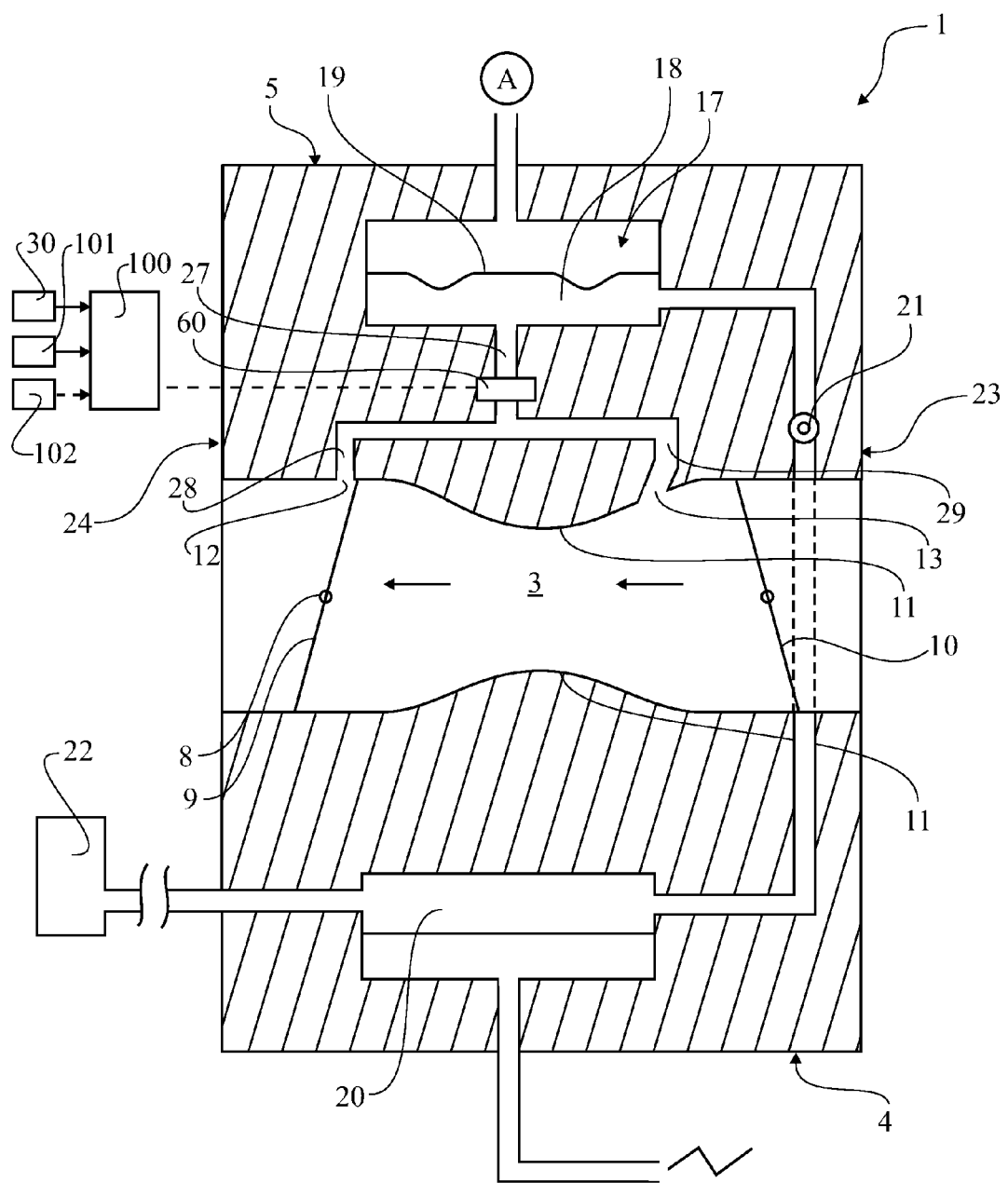
FIG. 1 is a schematic view showing the fuel supply to a diaphragm carburetor.
Figure 2:
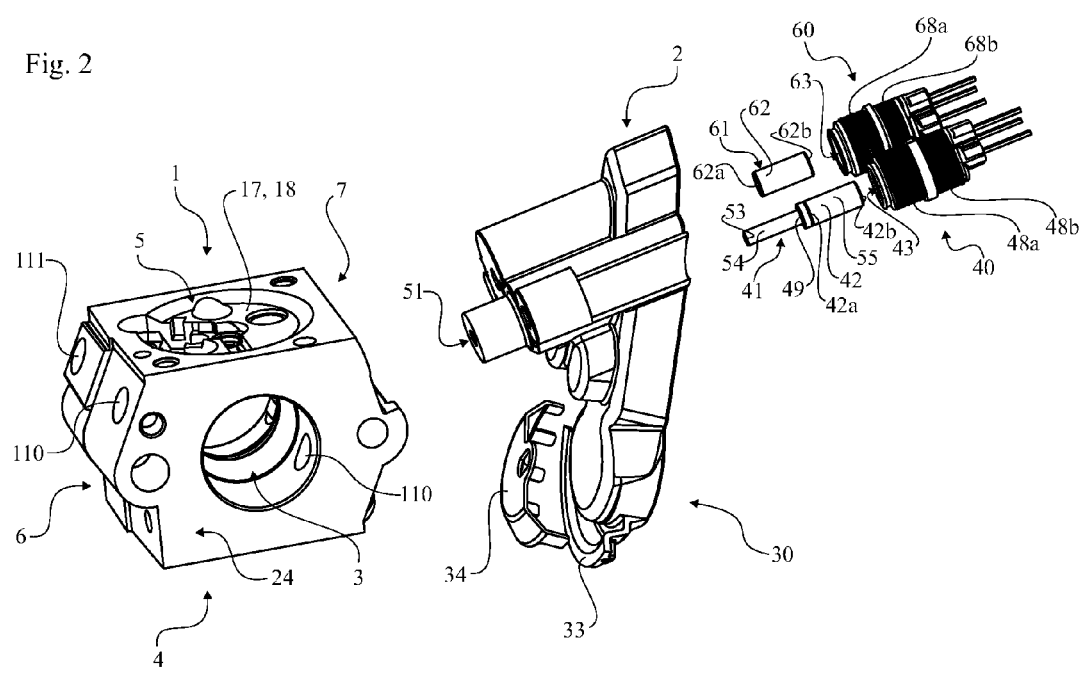
FIG. 2 and FIG. 3 are exploded views of a control module, a fuel valve, a first embodiment of a throttle position sensor, an air bleed valve and a carburetor main body.
Figure 3:
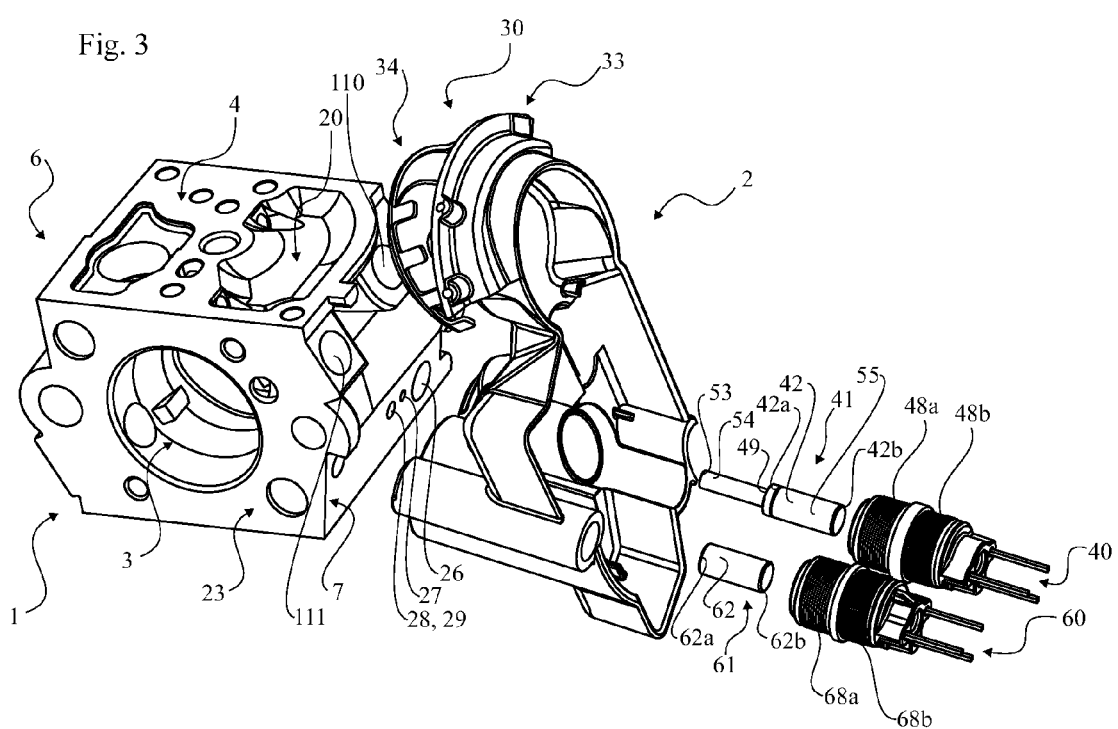
Figure 4:
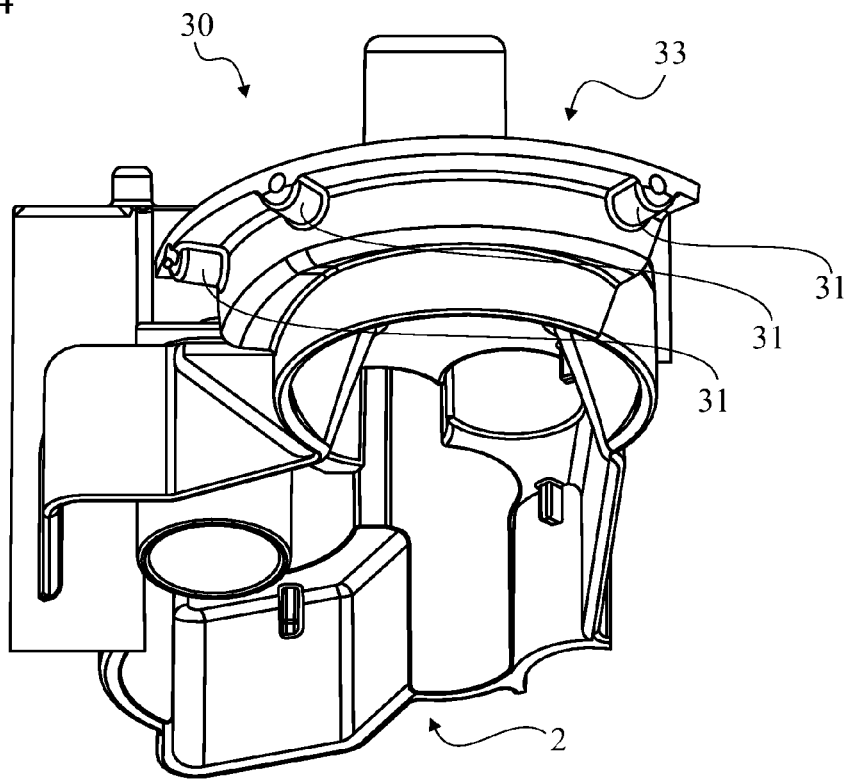
FIG. 4 is a perspective of the control module showing the first embodiment of the throttle position sensor.
Figure 5:
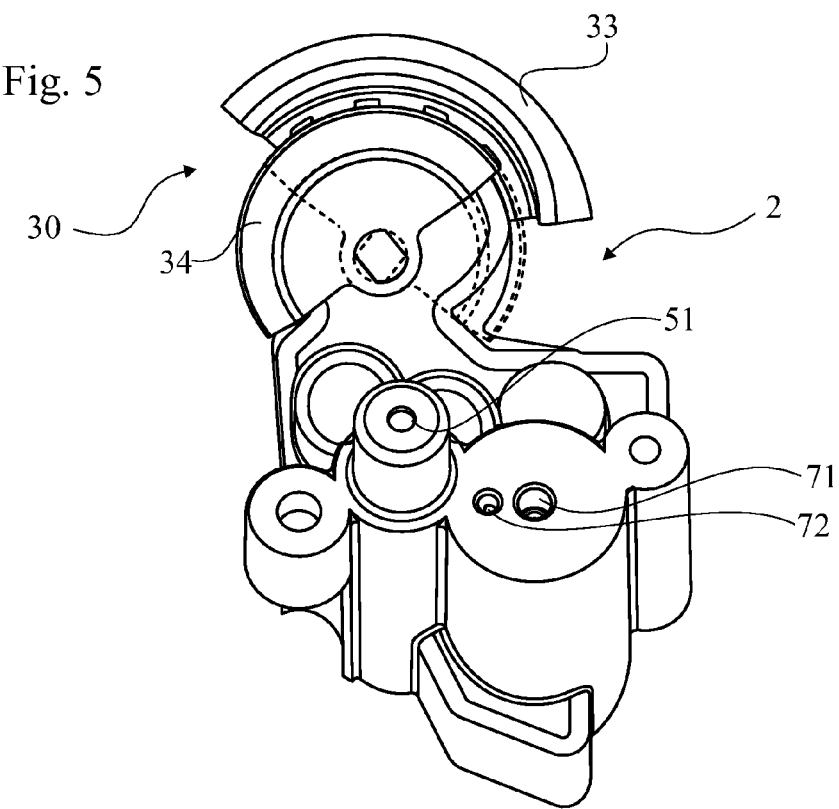
FIG. 5 is a front view of the control module.

FIG. 1 is a schematic view showing a fuel supply unit in the form of a diaphragm carburetor. The carburetor main body 1 has a main air passage 3 extending from an air inlet side 23 to an air outlet side 24. Air is drawn from an air inlet side 23 of the main body 1 via a choke valve 10, a venturi 11, and followed by a throttle valve 8, 9, towards the air outlet side 24 of the main body 1, as indicated by the arrows. As seen in FIGS. 2 and 3, the main body 1 has six sides; the air inlet side 23 opposite to the air outlet side 24, a fuel pump side 4 opposite to a fuel regulator side 5, and a first shaft side 6 opposite to a second shaft side 7. The throttle valve 8, 9 and choke valve 10 are preferably of butterfly type with a valve shaft and a valve plate, the throttle plate numbered 9 and the throttle shaft 8. The bore for the throttle shaft 8 is numbered 110 and the bore for the choke valve 111.

A fuel pump 20 is located on the fuel pump side 4 of the main body, and draws fuel from a fuel tank 22. The fuel pump may be a known pulsation controlled diaphragm pump, driven by the pressure pulse generated by a crankcase of the engine that the carburetor is supplying air and fuel mixture to. The fuel pump 20 delivers fuel, via a needle valve 21, to a fuel metering chamber 18 of a fuel regulator 17 located at the opposite fuel regulator side 5.

The fuel metering chamber 18 is separated from atmospheric pressure by a diaphragm 19 and can hold a predetermined amount of fuel. A duct 27, from fuel metering chamber 18, leads to a fuel valve 60. The fuel valve 60 opens or closes the interconnection between the fuel metering chamber 18 and the fuel lines 28, 29, leading to the main air passage 3. The smaller channel 28 leads to an idle nozzle 12 downstream the throttle valve 8, 9 and the coarser channel 29 leads to a principal nozzle 13 upstream the throttle valve 8, 9. Due to the varying pressures in the main air passage 3 as the engine operates fuel is drawn from the fuel metering chamber 18 through the main nozzle 13 and the idle nozzle 12; of course when the fuel valve 60 is closed fuel is prevented from being drawn from the fuel metering chamber 18. When the throttle valve is closed fuel is drawn from the idling nozzle 12 and when the throttle valve 8, 9 is full open fuel is drawn from both the idling nozzle 12 and the principal nozzle 13, however since the coarser fuel line 29 to the principal nozzle 13 is substantially larger than the finer fuel line 28 to the idling nozzle 12, the idling nozzle 12 hardly affects the fuel supply during full throttle.

The fuel valve 60 is controlled by an electronic control unit 100, that receives sensor inputs such as throttle position from a throttle positions sensor(s) 30; 300, engine speed from an engine speed sensor(s) 101, and optionally additional sensor (s) 102 such as e.g. a temperature sensor(s). The electronic control unit 100 can use these sensor inputs to decide when to open or close the fuel valve 60. The electronic control unit 100 may also control an air bleed valve 40, for bypassing air over the throttle valve 8, 9.

As seen in FIGS. 2 and 3, the fuel valve 60 and the main parts of the air bleed valve 40 and the throttle position sensor 30; 300 are preferably mounted in a control module 2. Preferably, also the electronic control unit 100 (only indicated in FIG. 1) 40, as well as corresponding electrical components, e.g. capacitor(s), are mounted in the control module 2, thereby the control module 2 can be assembled separately from the carburetor, i.e. on separate production lines. The control module 2 is mounted to the second shaft side 7, however it would also be possible to mount it on the first shaft side 6 or the fuel regulator side 5, of course then the path of the fuel lines 27, 28, 29 in the main body 1 must be changed. The control module 2 does preferably consist of one single unit but can of course be split into several units, which units can be mounted on different sides 4, 5, 6, 7 of the fuel supply unit 1.

Regarding the fuel valve 60 and the air bleed valve 40 described below the direction 'front' and 'rear' are in relation to the main body 1 of the carburetor, where the term 'front' refers to elements at the end facing the main body 1 and 'rear' refers to elements at the opposite end.

Fuel Valve

The fuel valve 60 will now be described in relation to FIGS. 1-3, 5, 6 and 9. The fuel valve 60 includes a valve body 73 with an axially extending chamber 63, an axially movable plunger 61 including a permanent magnet 62, electromagnetically operating means 68 *a*, 68 *b* for exerting a magnetic force to snap the plunger 61 between an open and a closed position when energized, and two opposite located ferromagnetic elements 66, 67 at each longitudinal end of the chamber 63.

The axially extending chamber 63 extends in a direction away from the main body 1 and has two opposite located valve seats 64, 65 limiting the axial movement of the plunger 61, a front valve seat 64 at the longitudinal end facing the main body 1, and a rear valve seat 65 at the opposite longitudinal end. At the longitudinal end facing the main body 1 there are also provided two ports, a first port 71 and second port 72, one of them 72 functioning as an inlet port to the fuel valve and the other 71 as an outlet port to the fuel valve 60. The ports are fluidly connected to one another when the fuel valve 60 is open, forming a fluid passage between them.

The first port 71, preferably the inlet, is enabled as an opening in the front valve seat 64 and connects to the fuel line 27 which has a connecting opening at the second shaft side 7 of the main body 1. The front end of the plunger 61 has a cross-section adapted to close the opening of the first port 71. The first port 71 is preferably a channel of circular cross-section connecting to the fuel line 27.

The second port 72, preferably the outlet, is enabled beside the front valve seat 64, and connects to the fuel lines 28, 29 which have a common connecting opening at the second shaft side 7 of the main body 1.

At each valve seat 64, 65 there is a ferromagnetic element 66, 67, a front ferromagnetic element 66 and a rear ferromagnetic element 67, preferably in the form of iron cores. These ferromagnetic elements 66, 67 serve to provide two stable valve positions, an open position when the plunger 61 abuts the rear valve seat 65 and a closed position when the plunger 61 abuts the front valve seat 64. At the closed position the front end of the plunger 61 closes the first port 71 at the front valve seat 64, preventing fluid from flowing between the first 71 and the second port 72.

The front ferromagnetic element 66 at least partly surrounds the channel of the first port 71, preferably in a form of an iron tube around the channel. I.e. preferably the front ferromagnetic element 66 provides a section of the channel of the first port 71.

The magnet 62 of the plunger 61 is at least a section of the plunger 61; preferably the entire plunger 61 is a magnet 62. The magnet 62 of the plunger 61 is magnetically oriented in the longitudinal direction, having a front magnetic pole 62*a* facing the front valve seat 64 which interacts with the front ferromagnetic element 66, and a rear magnetic pole 62*b* facing the rear valve seat 65 which interacts with the rear ferromagnetic element 67. The magnetic forces between the magnet 62 and respectively ferromagnetic element 66, 67 are controlled so that the magnetic force between the front pole 62*a* and the front ferromagnetic element 66 is stronger than the magnetic force between the rear pole 62*b* and the rear ferromagnetic element 67 when the plunger 61 abuts the front valve seat 64 and so that the magnetic force between the rear pole 62*b* and the rear ferromagnetic element 67 is stronger than the magnetic force between the front pole 62*a* and the front ferromagnetic element 66 when the plunger 61 abuts the rear valve seat 65.

The magnetic forces between the magnet 62 and respectively ferromagnetic element 66, 67 are controlled by distancing them from direct contact respectively with one another, by separating them through a front respectively rear non-magnetic material 69, 70 of the front respectively rear valve seats 64, 65. The main reason for this is to avoid direct contact between the ferromagnetic element 66, 67 with the magnet 62, since the magnetic force between a ferromagnetic element and a magnet is exponentially growing the closer they are; hence by distancing them the slope of the force curve between them is not as steep as if they were in direct contact, why the tolerances in the production do not need to be as high as if they were not distanced. It should be observed that the distancing could of course be enabled by having a non magnetic material at respectively end of the plunger 61 instead of encapsulating the ferromagnetic element 66, 67 in the valve seats 64, 65. If the distancing insulating material is too thin, there is a risk that it will wear off, whereby the magnetic force would increase drastically. Preferably, the distancing material is a polymer having a thickness in the range of 0.3-3 mm, more preferably 0.5-2 mm.

The plunger is preferably cylindrical having a diameter in the range of 2-12 mm, more preferred 3-8 mm and preferably having a length larger than the diameter.

The electromagnetically operating means 68*a*, 68*b* are provided by two solenoid coils 68*a*, 68*b* wound around the axially extending chamber 63 of the valve body 73. The solenoid coils 68*a*, 68*b* are wound at opposite winding directions to one another, where a first 68*a* of the two solenoids coils 68*a*, 68*b* are for snapping from open to closed position and a second of the two solenoids 68*b* are for snapping from closed to open. Of course it would be possible to have one or more solenoid coils 68*a*, 68*b* wound in the same direction, and instead switching the direction of the current to snap between the two positions. It should be observed that the solenoid coils 68*a*, 68*b* do not need to be energized to hold the plunger 61 at any of the two stable positions, thus the fuel valve 60 is bistable.

Air Bleed Valve

The air bleed valve 40 will now be described in relation to FIGS. 2-3, 5, 6 and 8. The air bleed valve 40 includes a valve body 52 with an axially extending chamber 43, an axially movable plunger 41 including a permanent magnet 42, electromagnetically operating means 48 *a*, 48 *b* for exerting a magnetic force to snap the plunger 41 between an open and a closed position when energized, and two opposite located ferromagnetic elements 46, 47 at each longitudinal end of the chamber 43.

The axially extending chamber 43 extends in a direction away from the main body 1 and has two opposite located valve seats 44, 45 limiting the axial movement of the plunger 41, a front valve seat 44 at the longitudinal end facing the main body 1, and a rear valve seat 45 at the opposite longitudinal end.

The plunger 41 includes a front section 54 made in a non-magnetic material, preferably a polymeric material, and a rear section 55, the rear section 55 including the magnet 42. The front section 54 protrudes through a valve seat aperture 51 in the front valve seat 44, which valve seat aperture 51 has a cross-section large enough for the front section 54 to protrude through but small enough to prevent the rear section 55 from protruding.

The throttle valve plate 9 has a valve plate aperture 25 in the rim of the valve plate 9, and the main body 1 of the carburetor has a bore 26 leading to the main air passage 3, so that when the plunger 41 and the throttle valve 8, 9 are in their closed positions, the front end 53 of the plunger front section 54 is adapted to mainly fill said valve plate aperture 25. When the plunger is in its closed position, the front end 53 is retracted from the valve plate aperture 25, allowing an air bleed flow through the throttle valve 8, 9 even when it is closed.

The area of the valve plate aperture 25 is preferably within in the range of 1-12 mm$^2$, more preferably in the range of 2-8 mm$^2$.

At each valve seat 44, 45 there is a ferromagnetic element 46, 47, front ferromagnetic element 46 and a rear ferromagnetic element 47, preferably in the form of iron cores. These ferromagnetic elements 46, 47 serve to provide two stable valve positions, an open position when the rear section 55 of the plunger 41 abuts the rear valve seat 45 and a closed position when the rear section 55 of the plunger 41 abuts the front valve seat 44.

The front ferromagnetic element 46 at least partly surrounds the valve seat aperture 51, preferably in a form of an iron tube around the aperture. I.e. preferably the front ferromagnetic element 46 provides at least a section of the aperture.

The magnet 42 of the plunger 41 is at least a section of the rear section 55, preferably almost the entire rear section 55 apart from the front end of the rear section 55 which preferably is of a nonmagnetic material functioning as a front distancing element 49, distancing the magnet 42 from the front ferromagnetic element 46. The magnet 42 is magnetically oriented in the longitudinal direction, having a front magnetic pole 42a facing the front valve seat 44 which interacts with the front ferromagnetic element 46, and a rear magnetic pole 42b facing the rear valve seat 45 which interacts with the rear ferromagnetic element 47. The magnetic forces between the magnet 42 and respectively ferromagnetic element 46, 47 are controlled so that the magnetic force between the front pole 42a and the front ferromagnetic element 46 is stronger than the magnetic force between the rear pole 42b and the rear ferromagnetic element 47 when the plunger 41 abuts the front valve seat 44 and so that the magnetic force between the rear pole 42b and the rear ferromagnetic element 47 is stronger than the magnetic force between the front pole 42a and the front ferromagnetic element 46 when the plunger 41 abuts the rear valve seat 45. The front section 54 of the plunger 41 is preferably of a nonmagnetic material, more preferably a polymeric material.

The magnetic forces between the magnet 42 and respectively ferromagnetic element 46, 47 are controlled by distancing them from direct contact with one another. Therefore the rear valve 45 seat comprises a distancing rear nonmagnetic material 50 in front of the rear ferromagnetic element 47. The front valve seat 44 does not need to be covered by a nonmagnetic material since the front end of the rear section which contacts the front wall seat is nonmagnetic. The main reason for this is to avoid direct contact between the ferromagnetic element 46, 47 with the magnet 42, since the magnetic force between a ferromagnetic element and a magnet is exponentially growing the closer they are; hence by distancing them the slope of the force curve between them is not as steep as if they were in direct contact, why the tolerances in the production do not need to be as high as if they were not distanced. It should be observed that the distancing could of course be enabled by having a non magnetic material at either the valve seat 44, 45 or the contacting portion of the plunger 41. If the distancing insulating material is too thin, there is a risk that it will wear off, whereby the magnetic force would increase drastically. Preferably, the distancing material is a polymer having a thickness in the range of 0.3-3 mm, more preferably 0.5-2 mm.

The rear section 55 of the plunger 41 is preferably cylindrical having a diameter in the range of 2-12 mm, more preferred 3-8 mm and preferably having a length larger than the diameter.

The electromagnetically operating means 48a, 48b are provided by two solenoid coils 48a, 48b wound around the axially extending chamber 43 of the valve body 52. The solenoid coils 48a, 48b are wound at opposite winding directions to one another, where a first 48a of the two solenoids coils 48a, 48b are for snapping from open to closed position and a second of the two solenoids 48b are for snapping from closed to open. Of course it would be possible to have one or more solenoid coils 48a, 48b wound in the same direction, and instead switching the direction of the current to snap between the two positions. It should be observed that the solenoid coils 48a, 48b do not need to be energized to hold the plunger 41 at any of the two stable positions, thus the bypass air valve 40 is bistable.

The energy consumption of the bypass air valve is kept low since it only needs to be energized when snapping between closed and open positions. By having a bistable bypass air valve which consumes low energy it is possible to actively use it during idle to compensate for different conditions affecting the engine performance, such as for instant fuel quality, air pressure, condition of the air filter, internal friction, etc. When starting the machine employing the air bleed valve, the start can be helped by having the air bleed valve open. Of course, also having the fuel valve bistable as described above is beneficial for the energy consumption of the machine using them.

Throttle Position Sensor

The throttle position sensor 30 shall now be explained in greater detail with reference to FIGS. 1-8 and 10a-q. As indicated in FIGS. 2-3 and 5-8 the throttle position sensor 30 of a first embodiment includes a movable portion 34, which substantially has the shape of a cup being split in halves along a central plane. The movable portion 34 is movable in relation to the fuel supply unit 1 and a fixed portion 33, shown in FIGS. 2-6 and 8, and the movable portion 34 being connected to a throttle shaft 8, as being shown in FIG. 8. Said throttle shaft 8 is fixedly connected to a throttle valve plate 9 of a throttle valve 8, 9 of a carburetor of an internal combustion engine. Instead of a carburetor other types of fuel supply units 1 may be used, e.g. low pressure injection systems. The throttle position sensor 30 is advantageously connected to a protruding end of the throttle shaft 8 on one side of the fuel supply unit 1, as being shown in FIG. 8. However, the throttle position sensor 30 could also be connected to both ends of the throttle shaft 8, or to some other means, that rotates in response to e.g. a throttle lever.

Figure 8:
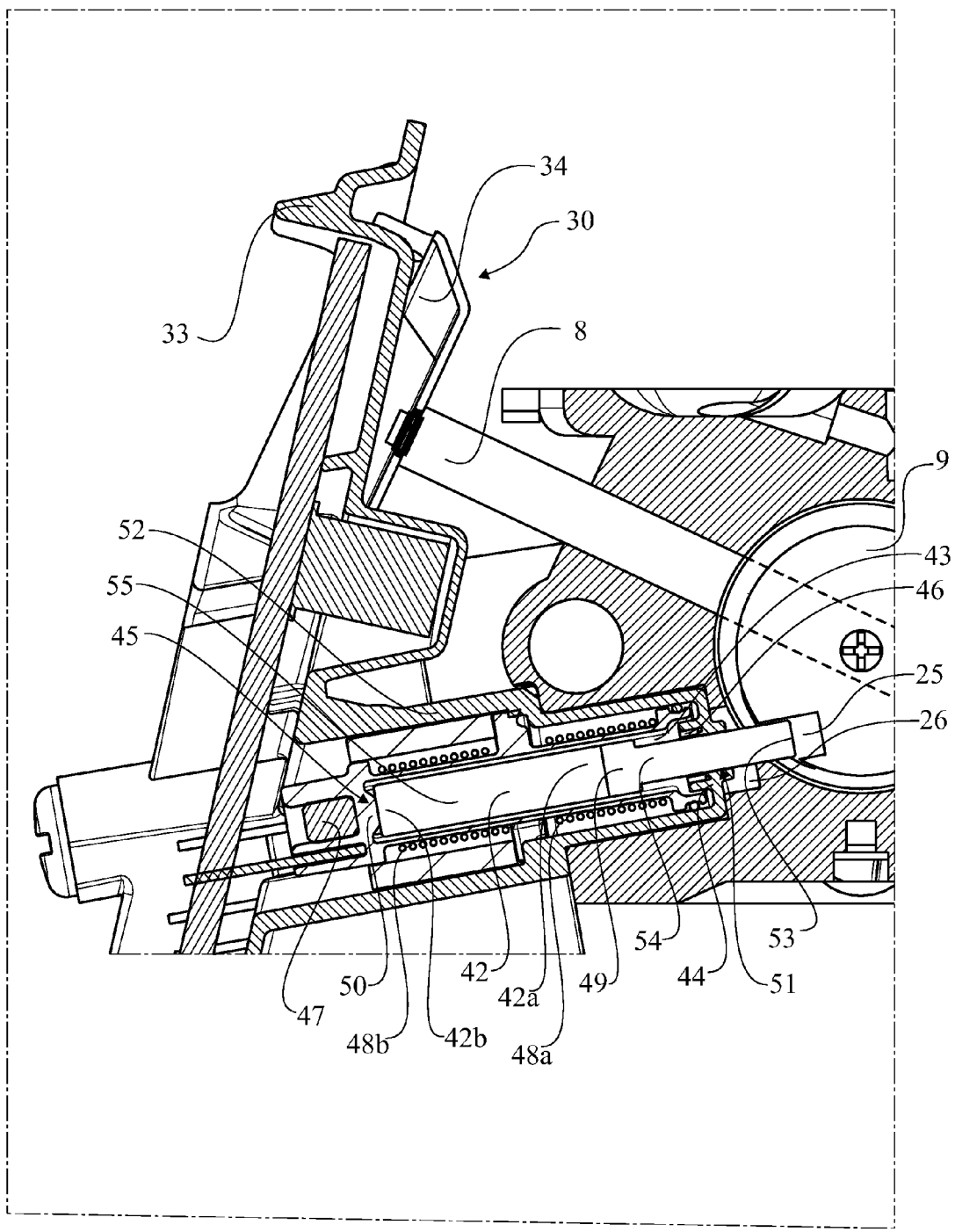
FIG. 8 is a cross section of the air bleed valve and the first embodiment of the throttle position sensor of the control module mounted to the carburetor.
Figure 9:
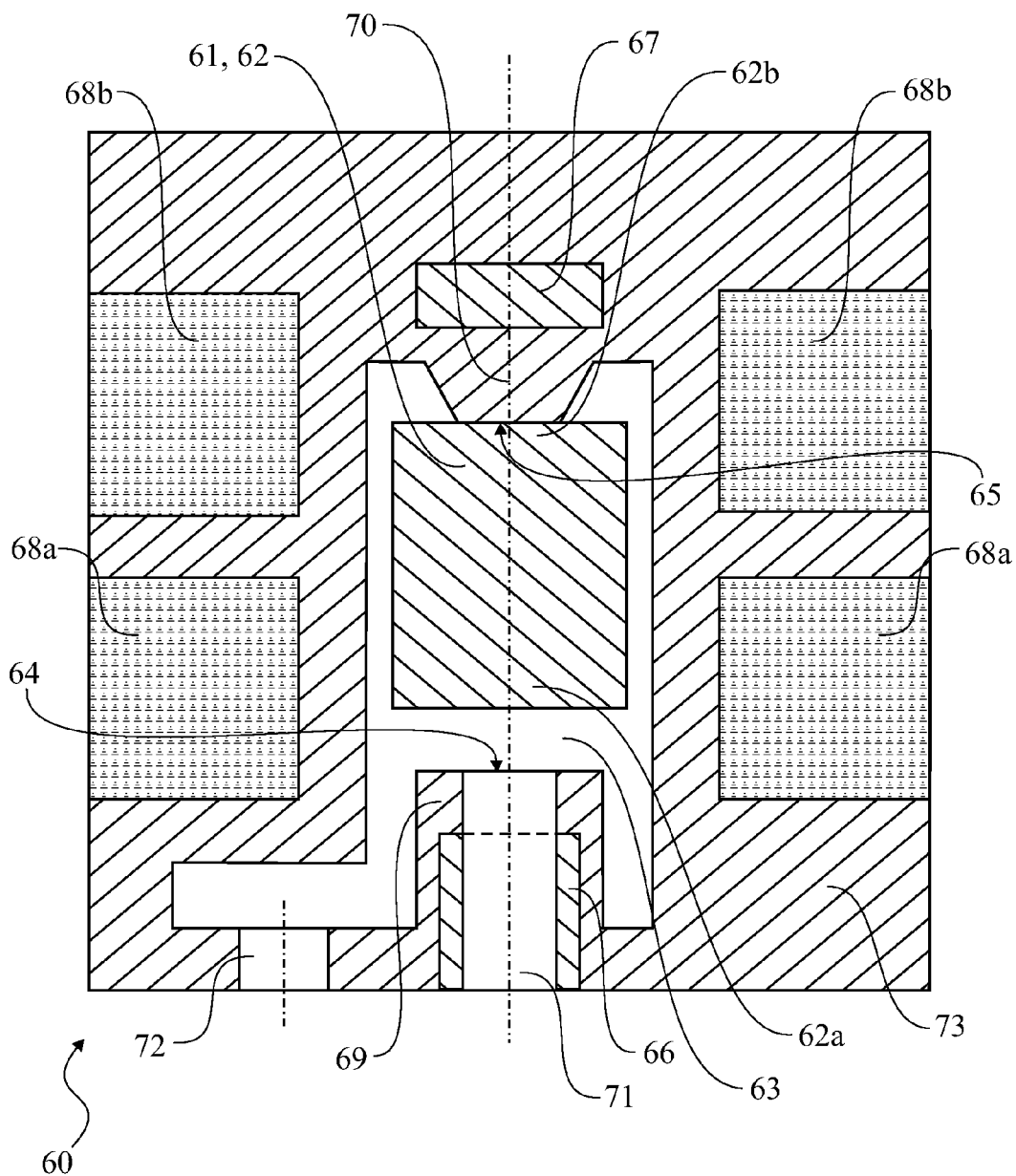
FIG. 9 is a schematic cross section of the fuel valve.

The throttle shaft 8 is part of a throttle valve 8, 9 and fixedly connected to a throttle valve plate 9. The throttle valve 8, 9 shown in FIGS. 1 and 8 is of butterfly type and has two end positions, representing an open and a closed position, which positions in turn correspond to the idle and the full throttle states of the internal combustion engine. In the first embodiment the end positions are separated by an angular distance of approximately 75°, but this may of course vary. Between the two end positions is the part throttle range.

The movable portion 34 and the throttle shaft 8 can be fixedly connected or connected through motion transfer elements to have an adapted motion. This means there could be gears or other elements between the throttle shaft 8 and the movable portion 34 for transferring the motion of the throttle shaft 8, allowing the movable portion 34 to rotate a longer or a shorter angular distance in relation to the throttle shaft 8. The movable portion 34 can e.g. be arranged to rotate 180° between the two end positions of the throttle shaft 8 and the throttle valve 8, 9. Such motion transfer elements are not shown in the figures.

The fixed portion 33 is fixed in relation to the movable portion 34 and being provided with pairs of one magnetic flux generating means 31 and one magnetic sensing element 32. The magnetic sensing element 32 being actuated by the magnetic flux of the magnetic flux generating means 31 of the same pair when the magnetic flux is not shielded by a magnetic flux guide 35.

Figure 7A:
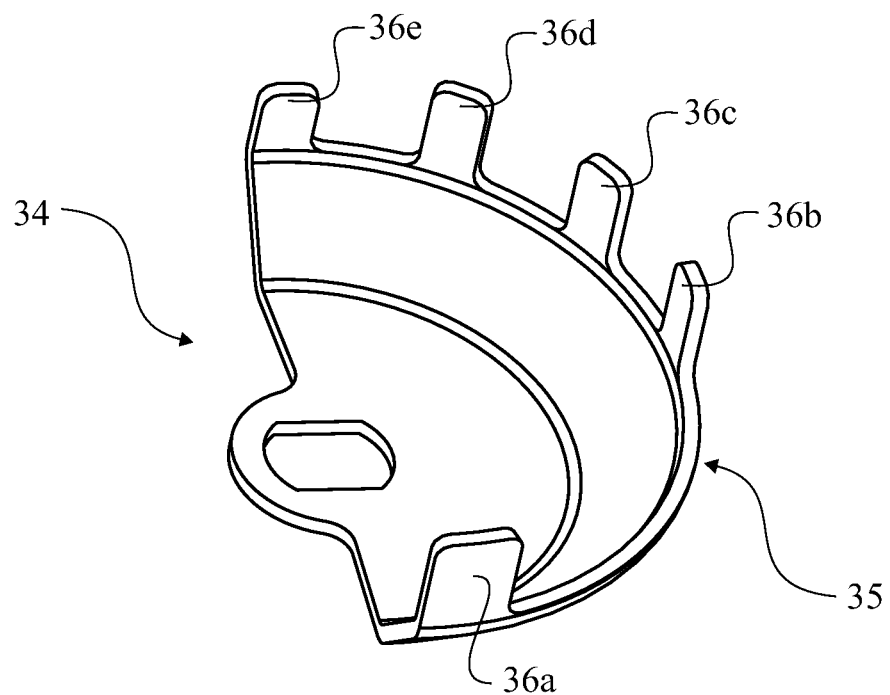
FIGS. 7a and 7b show the magnetic field guide which is a part of the movable portion of the first embodiment of the throttle position sensor.
Figure 7B:
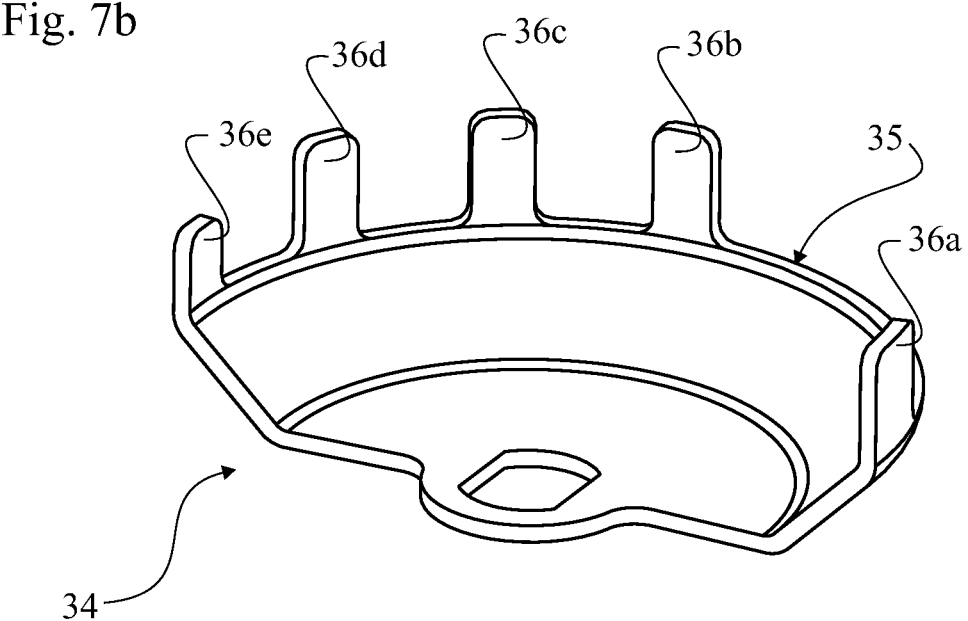

The magnetic flux guide 35 is connected to or a part of the movable portion 34. The magnetic flux guide 35 of said embodiment includes five teeth 36*a-e*, as is shown in FIGS. 7*a-b*, and rotates with the movable portion 34 between the two end positions of the throttle valve 8, 9 along a substantially circular motion path. Alternatively, the motion path can be arranged to be substantially linear. The teeth 36*a-e* of the magnetic flux guide 35 are arranged to shield and thereby weaken the magnetic flux density at a magnetic sensing element 32 from the magnetic flux from a magnetic flux generating means 31. Alternatively, the teeth 36*a-e* can be arranged to intensify the magnetic flux density at a magnetic sensing element 32. In such configuration the magnetic flux generating means 31 and the magnetic sensing elements 32 can be positioned on the same side of the motion path of the magnetic flux guide 35. In such configuration a magnetic sensing element 32 gets actuated when a tooth 36*a-e* is in a position where said tooth 36*a-e* forms a magnetic circuit together with the magnetic flux generating means 31. The magnetic flux density is strengthened because of the lowered reluctance for the magnetic circuit when passing a tooth 36*a-e* instead of an air gap. The magnetic sensing element 32 is arranged to be actuated by the strengthened magnetic flux for certain positions of the magnetic flux guide 35 and therefore also for certain positions of the throttle valve 8, 9.

The magnetic sensing element 32 is a digital hall sensor 32, which is able to generate one of two possible outputs, actuated or not actuated, depending on the magnetic flux density, e.g. generating the digital value '1' for flux density above a threshold value and '0' for flux density below said threshold value.

Figure 6:
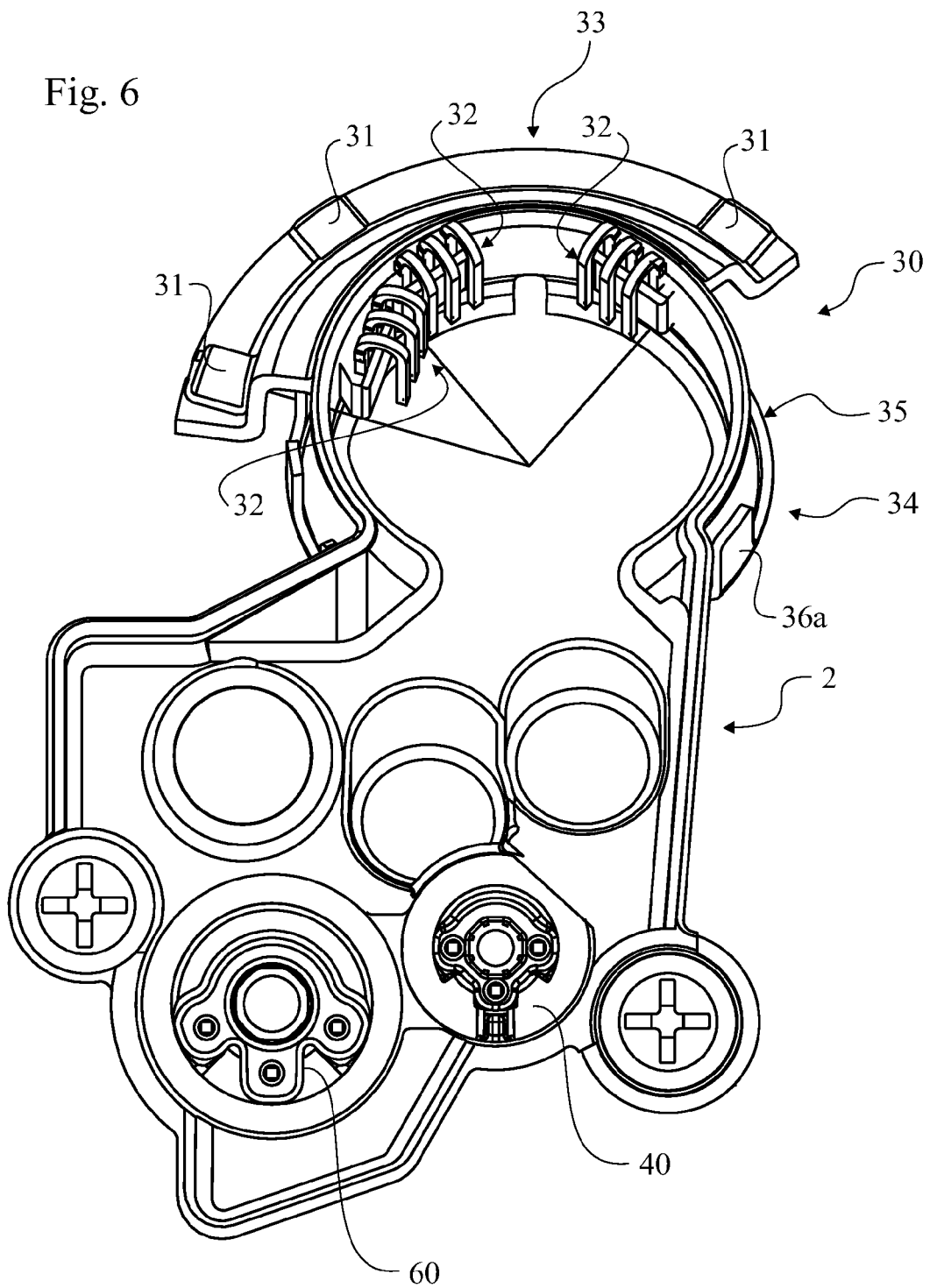
FIG. 6 shows a rear view of the control module.

As indicated in FIG. 6 the first embodiment of the throttle position sensor 30 includes three magnets 31 and three digital hall sensors 32 which are arranged in three pairs, each pair including one magnet 31 and one digital hall sensor 32. Each hall sensor 32 being configured to generate one of two possible values, actuated or not actuated. Alternatively, a pair can include more than one magnet 31 and more than one hall sensor 32, e.g. for improved reliability. The magnets 31 and the hall sensors 32 are mounted on the fixed portion 33 of the throttle position sensor 30. The teeth 36*a-e* of the magnetic flux guide 35 thus moves with the throttle shaft 8 and in relation to the fixed portion 33. The magnetic flux guide 35 has a motion path going through each of the three pairs of one magnet 31 and one hall sensor 32. When a tooth 36*a-e* is positioned between a magnet 31 and hall sensor 32 of such a pair, the magnetic flux is shielded and so much weakened at the hall sensor 32 that the hall sensor 32 goes from being actuated to not being actuated. Each detectable position of the throttle position sensor 30 corresponds to a state of the throttle position sensor 30. The state is formed by the states of all hall sensors 32 together. The states corresponding to idle and full throttle are unique but the states corresponding to the part throttle range are not unique, which means the same state can occur several times within the part throttle range. However, each state of each set of three successive states within the part throttle range is unique in relation to the other two states. This makes it possible to detect the direction of a change within the part throttle range. Thus, a throttle position sensor 30 according to this embodiment allows the possibility to indicate idle, full throttle and part throttle and the direction of change within the part throttle.

If an actuated hall sensor 32 is indicated by a digital value '1' and a non-actuated hall sensor 32 by a digital value '0', a throttle position sensor 30 with three hall sensors 32 and three magnets 31 can have possible states of three values ranging from '000' to '111', the values representing the values of a first, a second and a third hall sensor 32. With three magnets 31 and three hall sensors 32 and a magnetic flux guide 35 with five teeth 36*a-e*, at least thirteen states can be obtained. The two unique states of the two end positions of the throttle valve 8, 9 are '000' and '011' for said embodiment, but can of course be inverted or in other ways altered. The first hall sensor 32, represented by the left most value, has the value '0' only for the idle and full throttle states. This is a convenient way of ensuring unique states of the throttle position sensor 30. This means, however, that the states '010' and '001' are not used. Alternatively, the configuration is altered to use also these states. The part throttle range corresponds to the following eleven states:

'100 101 111 110
100 101 111 110
100 101 111'

Two whole series of four different states, '100 101 111 110' can be found. A configuration with a magnetic flux guide 35 with six teeth 36*a-e*, would add one of such series, a magnetic flux guide 35 with seven teeth 36*a-e* would add two series, etc. The opposite will apply for removing teeth 36*a-e*. A magnetic flux guide 35 with four teeth 36*a-e* would imply that the number of series is decremented by one, and for three teeth 36*a-e*, decremented by two.

Figure 10A:
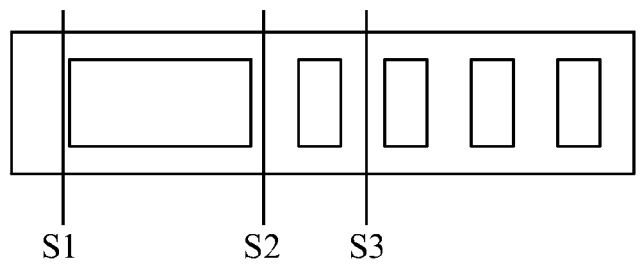
FIG. 10a-10q is a schematic view of a magnetic field guide of a configuration of the first embodiment of the throttle position sensor.
Figure 10B:
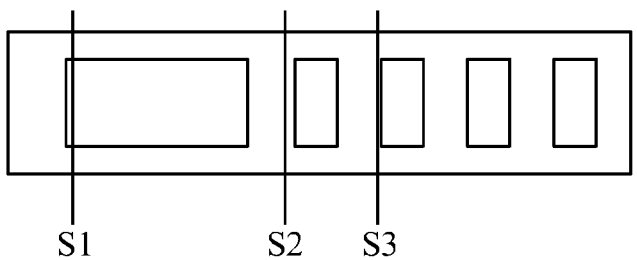
Figure 10C:
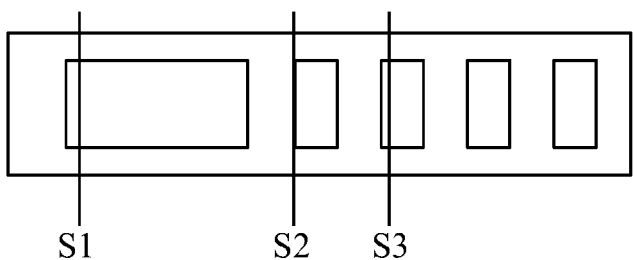
Figure 10D:
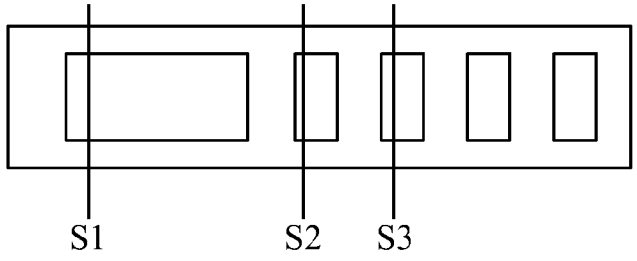
Figure 10E:
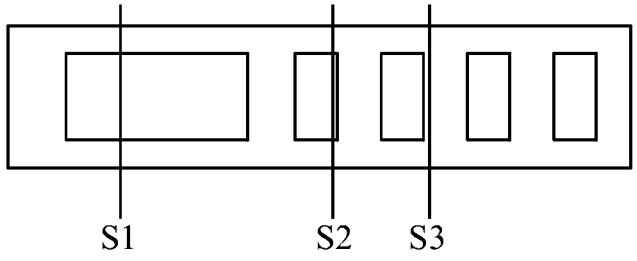
Figure 10F:
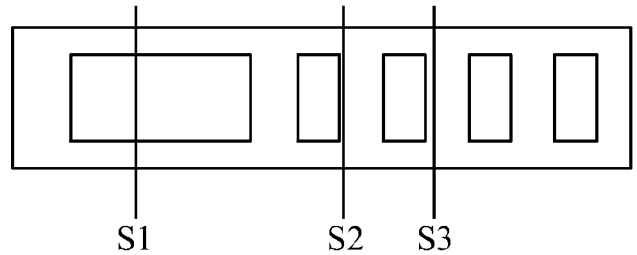
Figure 10G:
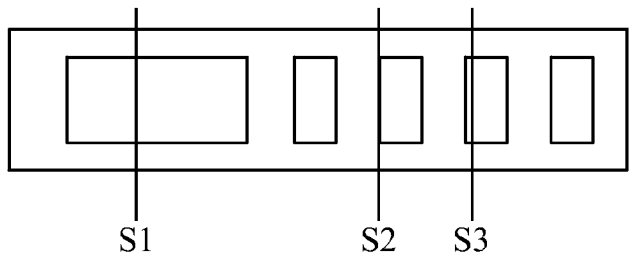
Figure 10H:
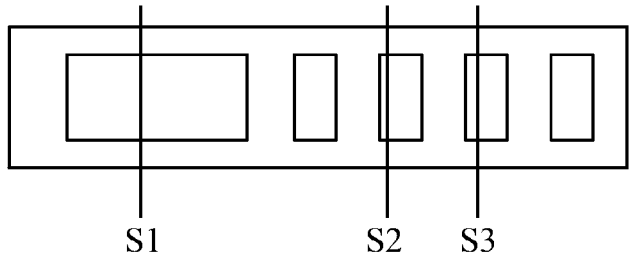
Figure 10I:
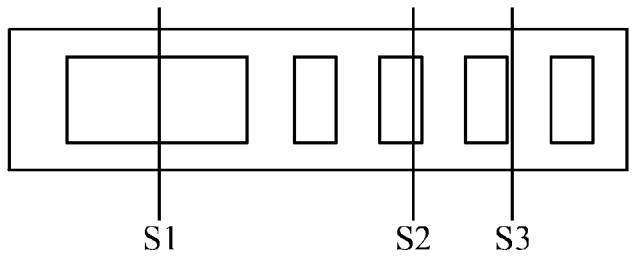
Figure 10J:
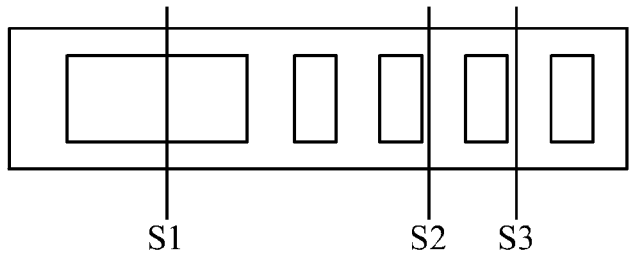
Figure 10K:
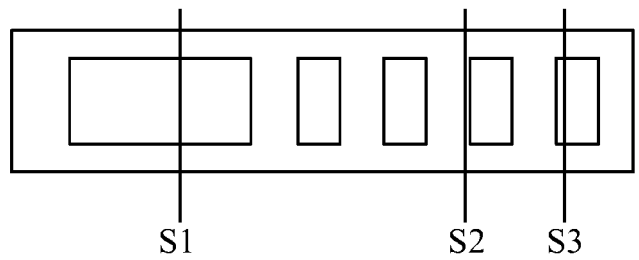
Figure 10L:
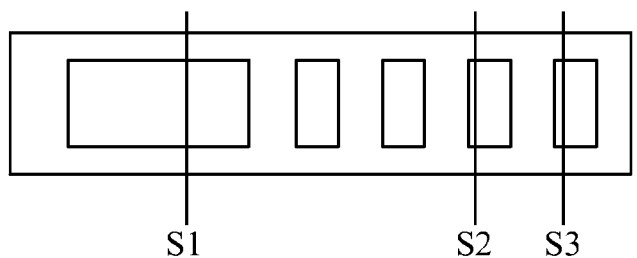
Figure 10M:
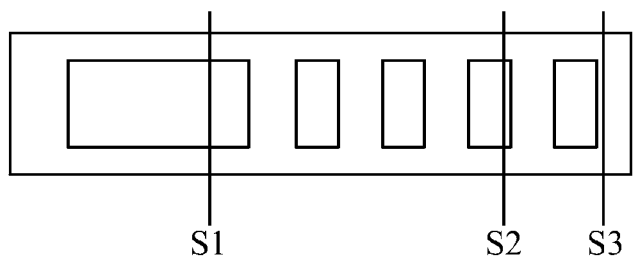
Figure 10N:
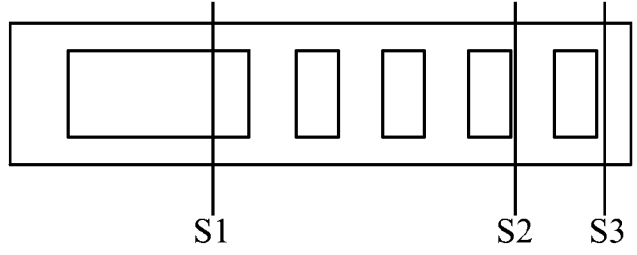
Figure 10O:
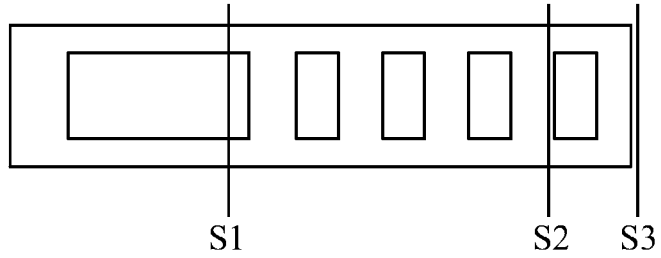
Figure 10P:
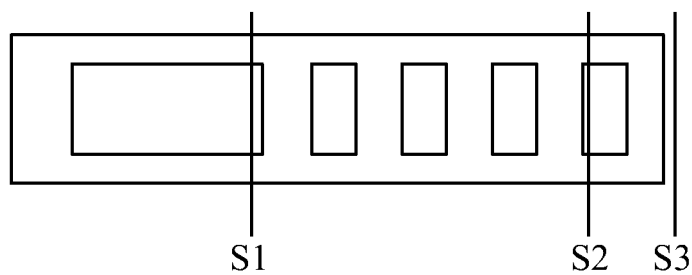
Figure 10Q:
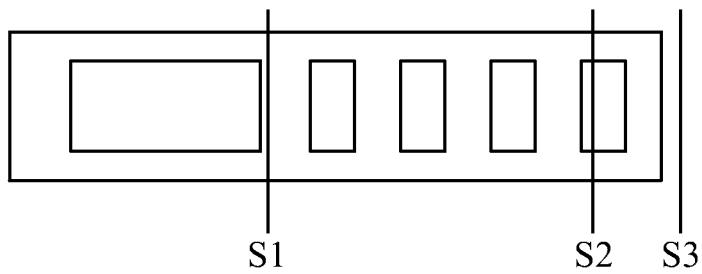

A schematic view of a magnetic flux guide 35 with six teeth 36*a-e* and five gaps is shown in FIG. 10*a-q*, wherein the five gaps are represented by five apertures. FIG. 10*a-q* further show 17 positions of the magnetic flux guide 35, wherein each position represents a possible state of the throttle position sensor 30, and the three lines indicated by S1-S3 represent the positions of three pairs of one hall sensor 32 and one magnet 31. A line across an aperture implies that the hall sensor 32 is not shielded from the magnet 31 and therefore actuated, which further means a digital value '1' is generated by the hall sensor 32. 10*a* shows the right most position of the magnetic flux guide 35, which corresponds to idle. When the magnetic flux guide 35 then moves to the left the throttle position sensor 30 passes the part throttle states shown in 10*b-p*. The left most position of the magnetic flux guide 35 which is shown in 10*q*, corresponds to full throttle. Thus, 10*a-q* correspond to the following 17 possible states of the throttle position sensor 30:

'000
100 101 111 110
100 101 111 110
100 101 111 110
100 101 111
011'

For a magnetic flux guide 35 with three teeth 36*a-e* the following states are possible:

'000
100 101 111
011'

For three teeth 36*a-e* all five states are unique, which can be advantageous for accomplishing exact positioning also within the part throttle range. If using one or two teeth 36*a-e*, three magnets 31 and three hall sensors 32 are not necessary. Then a configuration with two magnets 31 and two hall sensors 32 is more desirable which together with one or two teeth 36a-e can be arranged to generate four states e.g.: '11 10 00 10'.

In a very simple configuration of the first embodiment only one tooth 36a-e is used in combination with two magnets 31 and two hall sensors 32 and arranged only to generate two states, idle and full throttle.

In another configuration the magnets 31 and hall sensors 32 are mounted on the movable portion 34 and the magnetic flux guide 35 is mounted on the fixed portion 33.

The more teeth 36a-e the better resolution is possible, which means that a smaller change within the part throttle range can be detected.

It should be understood that the configuration of the magnetic flux guide 35 can be altered in many ways, to provide another order of possible states or to have more possible states or less possible states. The configuration can e.g. be inverted, i.e. the teeth 36a-e in FIGS. 7a-7b can be changed into gaps and the gaps can be changed into teeth 36a-e, whereby also the possible states of the throttle position sensor 30 are inverted.

In a second embodiment of the throttle position sensor 30 the magnets 31 are mounted on the movable portion 34 and the digital hall sensors 32 are mounted on the fixed portion 33 and no magnetic flux guide 35 is used. The movable portion 34 may be configured in a similar manner to the configuration in FIG. 7a-b, wherein each tooth 36a-e can be changed into a magnet 31 or a magnet 31 can be mounted onto each tooth 36a-e, but preferably the movable portion 34 has a more disc like configuration. Each hall sensor 32 is configured to generate one value for a magnetic flux density above a threshold value and a second value for below said threshold value. The magnetic flux density at a hall sensor 32 is above said threshold value when a magnet 31 and the hall sensor 32 are at certain positions in relation to each other and preferably when the magnet 31 and the hall sensor 32 are separated by a short distance or the shortest possible distance. To be able to detect two unique positions of the throttle shaft 8 and the throttle valve 8, 9 with this configuration, corresponding to the idle and the full throttle states of the internal combustion engine, two digital hall sensors 32 and at least one magnet 31 must be used. Preferably, more magnets 31 are used, e.g. five, and three hall sensors 32. The number of possible states of such configuration of the embodiment corresponds to the number of possible states of the throttle position sensor 30 according to the first embodiment of the throttle position sensor 30. In a configuration with a movable portion 34 similar to the one in FIG. 7a-b but with magnets 31 mounted onto each of the five teeth 36a-e, a set of 13 possible states are easily obtained for the throttle position sensor 30. As the movable portion 34 moves along its motion path between its two end positions, the hall sensors 32, which are mounted on the fixed portion 33, are alternately actuated and non-actuated as they are influenced by different magnetic flux densities as magnets 31 pass by. The 13 possible states of a configuration with three hall sensors 32 and five magnets 31, and no magnetic flux guide 35:

111
011 010 000 001
011 010 000 001
011 010 000

The first state, '111', and the last, '100', are unique and correspond to the end positions of the throttle valve 8, 9 and the idle and the full throttle states of the internal combustion engine. The states are inverted in relation to the states of the first embodiment.

However, the possible states of the throttle position sensor 30 can easily be arranged in another order, states can be added, removed or inverted, the throttle position still having at least a first and second unique state, representing the both end positions of the throttle valve 8, 9 and therefore also the idle and the full throttle states of the internal combustion engine. Preferably, the throttle position sensor 30 has a series of possible states corresponding to the part throttle range, enabling the throttle positions sensor 30 to indicate idle, part throttle, full throttle and the direction of change within the part throttle range.

In another configuration of the second embodiment of the throttle position sensor 30 the magnets 31 are mounted on the fixed portion 33 and the hall sensors 32 on the movable portion 34. No magnetic flux guide 35 is used and there has to be at least two hall sensors 32 and at least one magnet 31 to detect the two unique positions of the throttle shaft 8 and the throttle valve 8, 9, corresponding to the idle and the full throttle state of the internal combustion engine.

Figure 11:
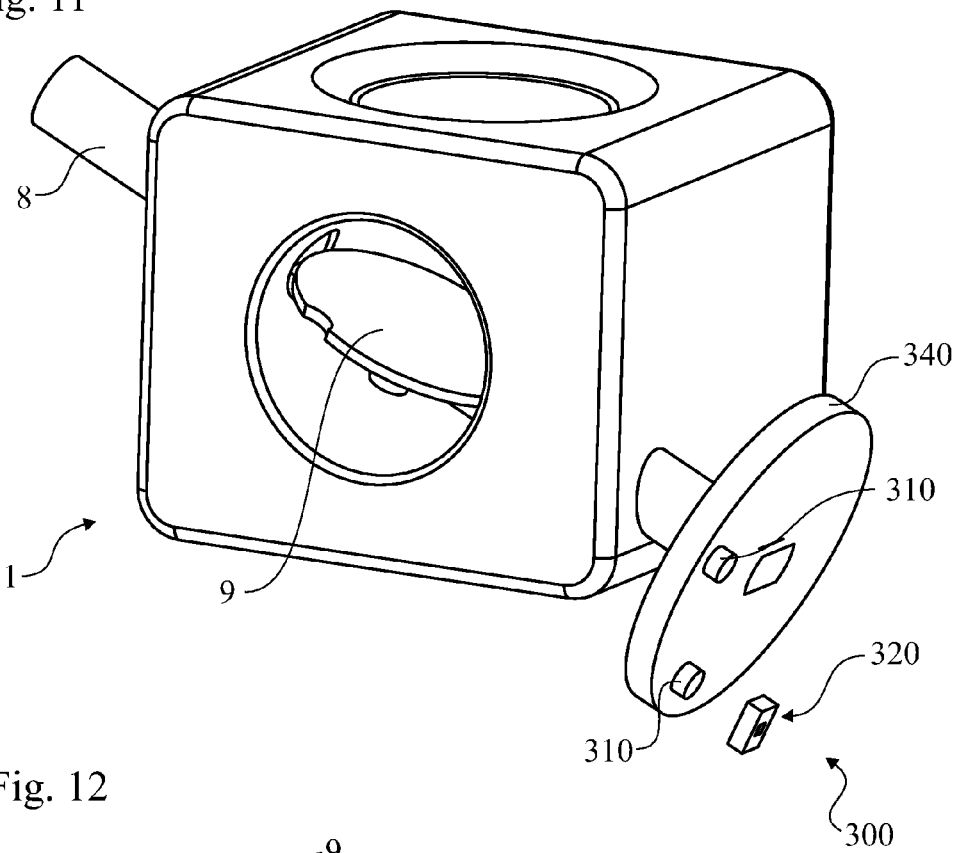
FIG. 11 shows another embodiment of the throttle position sensor.
Figure 12:
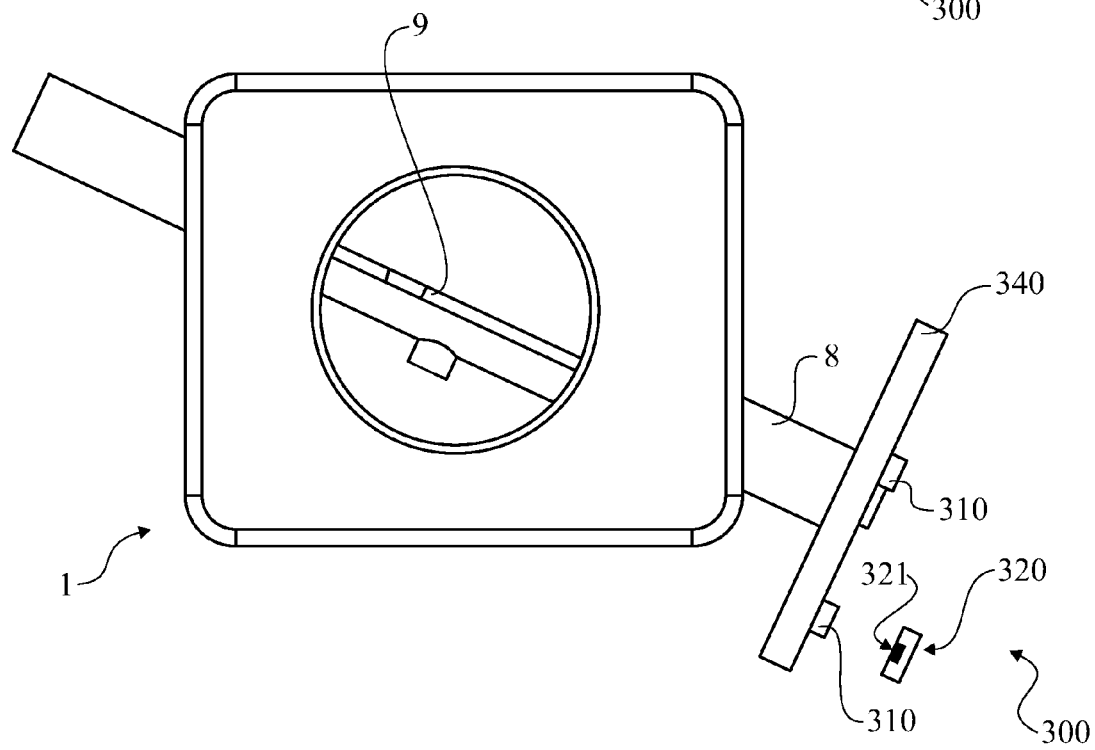
FIG. 12 shows another view of the another embodiment of the throttle position sensor.

In a third embodiment of a throttle position sensor 300 shown in FIGS. 11 and 12, the magnetic sensing element 320 is an analogous hall device 320 mounted to the fixed portion 33, which fixed portion is not shown in FIGS. 11 and 12. The analogous hall device has a hall element 321 which is configured to generate an output voltage that is proportional to the magnetic flux density through the hall element 321. The hall effect device 320 can have an integrated circuit for e.g. compensating for different conditions, such as temperature changes. The movable portion 340 has a substantially disc-like shape and is attached to the throttle shaft 8 at its centre and has two magnets 310 being polarized in a direction preferably perpendicular to the fixed portion. However, the movable portion 340 can of course be configured differently, e.g. having a triangular shape, or being provided with only one magnet 310 or more than two magnets 310. The magnets 310 are secured to the movable portion 340 at a distance from the axis of rotation and the magnets 310 are separated by approximately 75°. Further, the two magnets 310 are polarized in opposite direction in relation to each other, so as to form a magnetic flux density through the hall element 321 of the hall effect device 320 that is substantially proportional to the size of rotation of the movable portion 340 and the throttle shaft 8. Consequently, the analogous hall sensor 320 generates an output voltage being approximately linear in relation to size of rotation of the throttle shaft 8 and the throttle valve 8, 9. With this kind of hall effect device 320 an accurate value of the position of the throttle valve 8, 9 can be derived also within the part throttle range.

There could be a processing unit for processing data integrated in the throttle position sensor 300 or separated from it. Thus, the output value of the throttle position sensor 300 can vary in different embodiments or configurations of the throttle position sensor 300. Preferably, the throttle position sensor 300 is arranged to transfer data to an electronic control unit 100, where more processing or all processing can be done. The output of the throttle position sensor 300, which also can be referred to as the status of the throttle position sensor 300, preferably is the hall voltage of the hall element 321 of the hall effect device 320. The output value can be processed together with e.g. the rotation speed of the internal combustion engine, a measured value of the air/fuel mix and/or temperature etc, in order to optimize the air/fuel mixture to the internal combustion engine.

In a preferred configuration of the third embodiment of the throttle position sensor 300 an adaptivity feature is built-in in the electronic control unit 100, in order to at least improve the accuracy for detecting a closed or a full open throttle valve.

The electronic control unit 100 controls two threshold values that will be altered during engine operation to adapt to the real values corresponding to a closed and a full open throttle valve 8, 9, which real values in turn correspond to the maximum and the minimum output values of the throttle position sensor 300 and can be denoted by Vmax and Vmin. However, Vmax and Vmin will vary under influence of different conditions, such as different temperatures or stray magnetic fields. The electronic control unit 100 is therefore arranged to measure Vmax and Vmin during engine operation. There are several methods for concluding whether a measured value corresponds to the maximum or the minimum value of the throttle position sensor 300. The electronic control unit 100 can e.g. use information about the engine speed, and/or how long time the engine speed has been constant to conclude whether the maximum or the minimum value of the throttle position sensor 300 has been reached. Alternatively, the electronic control unit 100 only updates the maximum value when a value has been measured that is greater than the yet greatest measured value, and the minimum value is updated when a lower value than the yet lowest measured value is detected. The threshold values are recalculated to adapt to the measured real values. The throttle position sensor 300 output values are within a span, S=Vmax−Vmin, where S is the length of the span. The difference between a threshold value and the respective real value is preferably less than 10% of S. At engine start the electronic control unit 100 uses default threshold values, which means the difference between a threshold value and the corresponding real value are greater at engine start and some time thereafter. When the output of the throttle position sensor 300 is greater than the greatest threshold value a closed throttle valve is detected and when the output is smaller than the smallest threshold value a full open throttle valve is detected. However, by e.g. changing polarity of the magnets 310, the greatest threshold value will correspond to the full open position and the smallest threshold value will correspond to the closed position.

Alternatively, the electronic control unit 100 controls three threshold values that are derived from Vmax and Vmin during engine operation; the third threshold value is e.g. in the middle of the span S, so as to divide the span into four sub-ranges, of which two are used for detecting full throttle and idle, and the other two for detecting a lower part of part throttle and a higher part of part throttle. Preferably, the electronic control unit 100 controls more than three threshold values so as to form more than four discrete positions, e.g. ten discrete positions. The more discrete positions, the better accuracy when detecting throttle position.

Alternatively, the adaptivity feature is used for deriving a continuous output value. This can be done since the relation between the output value, which preferably is the hall voltage, and the angular displacement of the throttle valve is substantially linear and therefore describing the equation V=kD+h or D=(V−h)/k, where V is the output value of the throttle position sensor, D is the angular displacement of the throttle valve and h and k are constants. Knowing the maximum and the minimum output values of the throttle position sensor 300 and that they correspond to the known minimum and maximum values of the angular displacement, D, imply that the constants h and k can easily be derived. Thus, by measuring the maximum and the minimum output values of the throttle position sensor 300 during engine operation, also the accuracy of the detection of the angular displacement, D, within the part throttle range can be improved.

The adaptivity feature is very beneficial since it compensates not only for conditions such as temperature variations or stray magnetic fields, but also for variations among throttle position sensors. The throttle position sensors will vary from unit to unit because of manufacturing tolerances. The adaptivity enables less critical tolerances which in turn enables less costly units.

Ignition System

A preferred embodiment of the ignition system includes a flywheel with magnets and electromagnetic converting means, which electromagnetic converting means is arranged to convert magnetic energy into electrical energy, which electrical energy is used both for the ignition and for powering the means 30; 300, 40, 60, 100 in the control module 2 or at least one of the means 30; 300, 40, 60, 100 in the control module 2 and/or also components not located in the control module 2. Preferably, the flywheel includes a first and a second magnet separated by approximately 180°. The magnets periodically energize a first electromagnetic converting means, preferably a primary coil, as the flywheel rotates and the magnet moves near the coil. The primary coil preferably energizes a second electromagnetic converting means, the secondary coil, which has a winding with a greater number of turns of wire compared to the primary coil. Thus, adding a load to the secondary coil enables a very high voltage, suitable for ignition. Preferably, electrical energy for powering is taken from the primary coil, after being energized by at least the first of the two magnets, but preferably also after being energized by the second magnet, and electrical energy for ignition is taken from the secondary coil, which secondary coil has been energized by the primary coil.

Alternatively, the flywheel is provided with only one magnet or more than two magnets which can be separated by less than 180° and the at least one electromagnetic converting means can have other configurations but still being configured to convert magnetic energy to electrical energy both for ignition and powering.

The invention claimed is:
1. An electrically operated fluid valve for controlling a fluid flow in a fluid passage in a fuel supply unit of an internal combustion engine, the fluid valve comprising:
   an axially movable plunger including a permanent magnet having its magnetic direction axially oriented providing a front pole and a real pole;
   an axially extending chamber with two opposite located valve seats limiting the axial movement of the plunger, a front valve seat facing the front pole and a rear valve seat facing the rear pole;
   at least one front ferromagnetic element at the front valve seat and a rear ferromagnetic element at the rear valve seat, enabling two stable valve positions, a closed position, when the plunger rests at the front valve seat, preventing fluid flow in the fluid passage, and an open position, when the plunger rests at least one rear valve seat, allowing fluid flow in the fluid passage, by designing the forces between the magnet and respectively ferromagnetic element so that the magnetic force between the front pole and the front ferromagnetic force between the front pole and the front ferromagnetic element is stronger than the magnetic force between the rear pole and the rear ferromagnetic element when the plunger is at the front valve seat and so that the magnetic force between the rear pole and the rear ferromagnetic element is stronger than the magnetic force between the front pole and the front ferromagnetic element when the plunger is at the rear valve seat;
   electromagnetically operating means to axially snap the plunger between the two stable valve positions when energized; and at the closed respectively open position the magnet of the plunger and the ferromagnetic element of the corresponding valve seat are distanced from direct contact with each other.

2. An electrically operated fluid valve according to claim 1, wherein at least one of the valve seats comprises a distancing non-magnetic material facing the plunger.

3. An electrically operated fluid valve according to claim 2 wherein the thickness of the distancing non-magnetic material facing the plunger is in the range of 0.03-3 mm.

4. An electrically operated fluid valve according to claim 1 wherein the magnet is at least a section of the plunger.

5. An electrically operated fluid valve according to claim 1 wherein the magnet has a length larger than the diameter.

6. An electrically operated fluid valve according to claim 1 wherein the electromagnetically operating means are provided by at least one solenoid coil wound around at least the section of the plunger that includes the magnet.

7. An electrically operated fluid valve according to claim 6 wherein two solenoids coils are wound around at least the section of the plunger that includes the magnet, at opposite winding directions to one another, where at first of the two solenoids coils are for snapping from open to closed position and a second of the two solenoids are for snapping from closed open.

8. An electrically operated fluid valve according to claim 6 wherein the at least one solenoid coil is at least two solenoid coils wound in the same direction and that snapping from open to closed and from closed to open is enabled by switching the direction of the current energizing the at least two solenoid coils.

9. An electrically operated fluid valve according to claim 1 wherein the fluid valve is a fuel valve for controlling the fuel supply to a main air passage of the fuel supply unit.

10. An electrically operated fluid valve according to claim 9 wherein the fluid passage is formed between at least one inlet port and at least one outlet port to the chamber, both at least two ports being located at a front end of the chamber.

11. An electrically operated fluid valve according to claim 10 wherein the front valve seat includes at least one outlet port of the ports, and wherein the front end of the plunger has a cross-section adapted to close the at least one outlet port.

12. An electrically operated fluid valve according to claim 11 wherein the first port is a channel of circular cross-section and wherein the front ferromagnetic element at least partly surrounds the channel.

13. An electrically operated fluid valve according to claim 1 wherein the fluid valve is a bypass air valve for bypassing air over a closed throttle valve mounted in a main air passage of the fuel supply unit, the throttle valve including a rotatably mounted valve shaft having a valve plate centrally secured to the valve shaft.

14. An electrically operated fluid valve according to claim 13 wherein the fluid passage is a valve plate aperture in the rim of the valve place, and wherein the plunger includes a front end adapted to mainly fill said valve plate aperture when the plunger and the throttle valve is in its closed position and where the front end is retracted from the valve plate aperture when the plunger is in its open position.

15. An electrically operated fluid valve according to claim 14 wherein the area of the valve plate aperture is within the range of 1-12 $mm^2$.

16. An electrically operated fluid valve according to claim 14 wherein the front end of the plunger enters the main air passage through a bore in the fuel supply unit.

17. An electrically operated fluid valve according to claim 13 wherein the plunger moves essentially transversely in relation to the air flow direction in the main air passage.

18. An electrically operated fluid valve according to claim 13 wherein in the plunger includes a rear section and a front section having the front end, and which rear section includes the magnet, the front section protrudes through a valve seat aperture in the front valve seat and has a smaller cross-section than the rear section, and which valve seat aperture has a cross-section large enough for the front section to protrude through small enough to prevent the rear section from protruding.

19. An electrically operated fluid valve according to claim 18 wherein the front ferromagnetic element at least partly surrounds the valve seat aperture.

20. An electrically operated fluid valve according to claim 13 wherein the front section of the plunger is of a non-magnetic material.

21. A fuel supply unit comprising:
a main air passage the main air passage having a throttle valve mounted therein including a throttle shaft extending between two to one another opposite located shaft sides, and a control module for the fuel supply mounted to one of the shaft sides, the control module including:—
throttle position detecting means for monitoring the position of the throttle valve, and a fuel valve for controlling the fuel supply to the main air passage, the fuel valve comprising:
an axially movable plunger including a permanent magnet having its magnetic direction axially oriented providing a front pole and a real pole;
an axially extending chamber with two opposite located valve seats limiting the axial movement of the plunger, a front valve seat facing the front pole and a rear valve seat facing the rear pole;
at least one front ferromagnetic element at the front valve seat and a rear ferromagnetic element at the rear valve seat, enabling two stable valve positions, a closed position, when the plunger rests at the front valve seat, preventing fluid flow in the fluid passage, and an open position, when the plunger rests at least one rear valve seat, allowing fluid flow in the fluid passage, by designing the forces between the magnet and respectively ferromagnetic element so that the magnetic force between the front pole and the front ferromagnetic force between the front pole and the front ferromagnetic element is stronger than the magnetic force between the rear pole and the rear ferromagnetic element when the plunger is at the front valve seat and so that the magnetic force between the rear pole and the rear ferromagnetic element is stronger than the magnetic force between the front pole and the front ferromagnetic element when the plunger is at the rear valve seat;
electromagnetically operating means to axially snap the plunger between the two stable valve positions when energized; and
at the closed respectively open position the magnet of the plunger and the ferromagnetic element of the corresponding valve seat are distanced from direct contact with each other wherein the fluid valve is a fuel valve for controlling the fuel supply to a main air passage of the fuel supply unit.

22. A control module for a fuel supply unit of an internal combustion engine including a throttle position detecting means for monitoring the position of a throttle valve mounted in a main air passage of the fuel supply unit, a fuel valve for controlling the fuel supply to the main air passage, the fuel valve comprising:

an axially movable plunger including a permanent magnet having its magnetic direction axially oriented providing a front pole and a real pole;

an axially extending chamber with two opposite located valve seats limiting the axial movement of the plunger, a front valve seat facing the front pole and a rear valve seat facing the rear pole;

at least one front ferromagnetic element at the front valve seat and a rear ferromagnetic element at the rear valve seat, enabling two stable valve positions, a closed position, when the plunger rests at the front valve seat, preventing fluid flow in the fluid passage, and an open position, when the plunger rests at least one rear valve seat, allowing fluid flow in the fluid passage, by designing the forces between the magnet and respectively ferromagnetic element so that the magnetic force between the front pole and the front ferromagnetic force between the front pole and the front ferromagnetic element is stronger than the magnetic force between the rear pole and the rear ferromagnetic element when the plunger is at the front valve seat and so that the magnetic force between the rear pole and the rear ferromagnetic element is stronger than the magnetic force between the front pole and the front ferromagnetic element when the plunger is at the rear valve seat;

electromagnetically operating means to axially snap the plunger between the two stable valve positions when energized; and at the closed respectively open position the magnet of the plunger and the ferromagnetic element of the corresponding valve seat are distanced from direct contact with each other wherein the fluid valve is a fuel valve for controlling the fuel supply to a main air passage of the fuel supply unit.

23. A control module according to claim 22, wherein the control module further includes a bypass air valve for bypassing air over a closed throttle valve mounted in a main air passage of the fuel supply unit, the throttle valve including a rotatably mounted valve shaft having a valve plate centrally secured to the valve shaft.

\* \* \* \* \*